United States Patent
Stewart et al.

(10) Patent No.: US 10,048,862 B2
(45) Date of Patent: Aug. 14, 2018

(54) MANAGING AN ON-SCREEN KEYBOARD

(71) Applicant: LENOVO (Singapore) PTE, LTD., New Tech Park, SC (US)

(72) Inventors: Aaron Michael Stewart, Raleigh, NC (US); Lance Warren Cassidy, Raleigh, NC (US); Jeffrey E. Skinner, Raleigh, NC (US); Jonathan Jen-Wei Yu, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 762 days.

(21) Appl. No.: 14/479,992

(22) Filed: Sep. 8, 2014

(65) Prior Publication Data
US 2016/0070465 A1 Mar. 10, 2016

(51) Int. Cl.
*G06F 3/00* (2006.01)
*G06F 3/0488* (2013.01)
*G06F 3/0489* (2013.01)

(52) U.S. Cl.
CPC ........ *G06F 3/04886* (2013.01); *G06F 3/0488* (2013.01); *G06F 3/0489* (2013.01)

(58) Field of Classification Search
CPC ... G06F 3/0488; G06F 3/04886; G06F 3/0489
See application file for complete search history.

(56) References Cited

U.S. PATENT DOCUMENTS

| | | | | |
|---|---|---|---|---|
| 8,553,000 B2* | 10/2013 | Nakatani | ............... | G06F 3/0418 178/18.01 |
| 8,782,550 B1* | 7/2014 | Patridge | ................ | G06F 3/0488 715/702 |
| 8,843,844 B2* | 9/2014 | Laubach | ............... | G06F 3/0238 345/168 |
| 8,959,430 B1* | 2/2015 | Spivak | .................... | G06F 3/048 715/243 |
| 9,367,141 B2* | 6/2016 | Griffin | .................. | G06F 1/1626 |
| 9,377,871 B2* | 6/2016 | Waddell | ............... | G06F 3/0237 |
| 2007/0152976 A1 | 7/2007 | Townsend et al. | | |
| 2008/0174561 A1* | 7/2008 | Kim | .................... | G06F 3/04883 345/173 |
| 2008/0204282 A1* | 8/2008 | Jeon | ........................ | G06F 3/018 341/22 |
| 2008/0278455 A1* | 11/2008 | Atkins | ................ | G06F 3/04883 345/173 |

(Continued)

FOREIGN PATENT DOCUMENTS

| CN | 102012738 A | 4/2011 |
|---|---|---|
| CN | 103713766 A | 4/2014 |
| CN | 103984433 A | 8/2014 |

Primary Examiner — Tadeese Hailu
Assistant Examiner — Andrew Chung
(74) Attorney, Agent, or Firm — Kunzler, PC

(57) ABSTRACT

An apparatus, method, and program product is disclosed for on-screen keyboard management. A touch screen displays an on-screen keyboard, a processor is operatively coupled to the touch screen, and a memory stores code executable by the processor. The code determines a duration associated with a key event in response to a key press on the on-screen keyboard, and ignores the key press in response to determining that the duration associated with the key event satisfies a predetermined threshold.

18 Claims, 10 Drawing Sheets

(56) References Cited

U.S. PATENT DOCUMENTS

| | | | | |
|---|---|---|---|---|
| 2010/0146459 A1* | 6/2010 | Repka | ................... | G06F 3/0488 |
| | | | | 715/863 |
| 2011/0254772 A1* | 10/2011 | Adamson | ............ | G06F 3/04883 |
| | | | | 345/168 |
| 2011/0302491 A1* | 12/2011 | Griffin | ................. | G06F 3/0488 |
| | | | | 715/702 |
| 2012/0081277 A1* | 4/2012 | de Paz | ................. | G06F 1/1616 |
| | | | | 345/156 |
| 2012/0256846 A1* | 10/2012 | Mak | ..................... | G06F 3/0488 |
| | | | | 345/173 |
| 2012/0306903 A1* | 12/2012 | Griffin | ................. | G06F 1/1694 |
| | | | | 345/589 |
| 2013/0227483 A1* | 8/2013 | Thorsander | ......... | G06F 3/04842 |
| | | | | 715/821 |
| 2013/0229351 A1* | 9/2013 | Whitt, III | .............. | G06F 1/1618 |
| | | | | 345/168 |
| 2013/0246970 A1* | 9/2013 | Helle | ................... | G06F 3/0482 |
| | | | | 715/822 |
| 2015/0029115 A1* | 1/2015 | Hlatky | ................... | G06F 3/041 |
| | | | | 345/173 |
| 2015/0160833 A1* | 6/2015 | Hori | ...................... | G06F 1/1694 |
| | | | | 715/765 |
| 2015/0277571 A1* | 10/2015 | Landau | .............. | G06F 3/04842 |
| | | | | 715/863 |
| 2016/0098190 A1* | 4/2016 | Lu | ...................... | G06F 3/04886 |
| | | | | 715/773 |

\* cited by examiner

MANAGING AN ON-SCREEN KEYBOARD

BACKGROUND

Field

The subject matter disclosed herein relates to virtual keyboards and more particularly relates to managing input received by a virtual keyboard.

Description of the Related Art

Electronic devices may include touchscreens that receive input from a user in response to a user's touch with one or more fingers or an input device, such as a stylus. Some electronic devices may be configured to present virtual input devices on their touchscreens, such as an on-screen keyboard. The on-screen keyboard may be configured to receive user input in response to a user interacting with the "buttons" of the virtual keyboard via the touchscreen. Some virtual keyboards, however, may not allow the user to rest her hands comfortably on the touchscreen while typing because of the manner in which the touch input is detected and received by the on-screen keyboard. Thus, a user may be forced to hover their hands above the on-screen keyboard, which may be an uncomfortable and fatiguing posture to maintain while typing.

BRIEF SUMMARY

An apparatus for on-screen keyboard management is disclosed. A method and computer program product also perform the functions of the apparatus. In one embodiment, an apparatus includes a touch screen that displays an on-screen keyboard and a processor operably coupled to the touchscreen. In a further embodiment, the apparatus includes a memory that stores code executable by the processor. In some embodiments, the apparatus includes code that determines a duration associated with a key event in response to a key press on the on-screen keyboard. In certain embodiments, the apparatus includes code that ignores the key press in response to determining that the duration associated with the key event satisfies a predetermined threshold.

In one embodiment, the key event comprises a key down event and the duration associated with the key down event comprises an amount of time that the key press is performed. In some embodiments, the key press is ignored in response to the duration exceeding the predetermined threshold. In a further embodiment, the key event comprises a key up event and the duration associated with the key up event comprises an amount of time between the key up event for the key press and a key down event for a subsequent key press. In some embodiments, the subsequent key press is ignored in response to the duration being below the predetermined threshold.

In a further embodiment, the key event comprises a key down event and the duration associated with the key down event comprises an amount of time between the key down event for the key press and a key down event for a subsequent key press. In some embodiments, the key press and the subsequent key press are ignored in response to the duration being below the predetermined threshold. In one embodiment, the apparatus includes code that adjusts the predetermined threshold to correspond to a user's keystroke timing patterns. In certain embodiments, the predetermined threshold is adjusted in response to tracking the keystroke timing patterns of the user for a predetermined period of time.

In some embodiments, the apparatus includes code that maintains an arrival order of the key press and a subsequent key press. In a further embodiment, input received from the key press is recognized before input received from the subsequent key press in response to a key up event for the subsequent key press occurring before a key up event for the key press.

In one embodiment, the apparatus includes code that suggests at least one word comprising a character associated with an ignored key press in response to a key press being ignored. In a further embodiment, the apparatus includes code that delays the key event as a function of a key associated with the key event being at a predefined resting location. In such an embodiment, the key event comprises a key down event. In certain embodiments, the apparatus includes code that disables a dwell function associated with the key press in response to determining that the duration associated with the key event exceeds the predetermined threshold. In such an embodiment, the key event comprises a key down event. In some embodiments, the apparatus includes code that disables a dwell function associated with the key press as a function of a key associated with the key press being at a predefined keyboard resting location.

A method, in one embodiment, includes determining, by use of a processor, a duration associated with a key event in response to a key press on an on-screen keyboard. In a further embodiment, the method includes ignoring the key press in response to determining that the duration associated with the key event satisfies a predetermined threshold. In some embodiments, the key event comprises a key down event and the duration associated with the key down event comprises an amount of time that the key press is performed. In some embodiments, the key press is ignored in response to the duration exceeding the predetermined threshold.

In a further embodiment, the key event comprises a key up event and the duration associated with the key press comprises an amount of time between the key up event for the key press and a key down event for a subsequent key press. In certain embodiments, the subsequent key press is ignored in response to the duration being below the predetermined threshold.

In one embodiment, the key event comprises a key down event and the duration associated with the key press comprises an amount of time between the key down event for the key press and a key down event for a subsequent key press. In some embodiments, the key press and the subsequent key press are ignored in response to the duration being below the predetermined threshold. In one embodiment, the method includes adjusting the predetermined threshold to match a user's keystroke timing patterns. In some embodiments, the predetermined threshold is adjusted in response to tracking the keystroke timing patterns of the user for a predetermined period of time.

In some embodiments, the method includes maintaining an arrival order of the key press and a subsequent key press. In a further embodiment, input received from the key press is recognized before input received from the subsequent key press in response to a key up event for the subsequent key press occurring before a key up event for the key press.

In a further embodiment, the method includes delaying the key event as a function of a key associated with the key event being at a predefined resting location. In such an embodiment, the key event comprising a key down event. In one embodiment, the method includes disabling a dwell function associated with the key press in response to determining that the duration associated with the key event exceeds the predetermined threshold. In such an embodiment, the key event comprises a key down event. The method, in certain embodiments, further includes disabling a dwell function associated with the key press as a function of a key associated with the key press being at a predefined keyboard resting location.

In one embodiment, a program product comprising a computer readable storage medium that stores code executable by a processor is disclosed. In certain embodiments, the executable code determines a duration associated with a key event in response to a key press on an on-screen keyboard. In a further embodiment, the executable code ignores the key press in response to determining that the duration associated with the key event satisfies a predetermined threshold.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
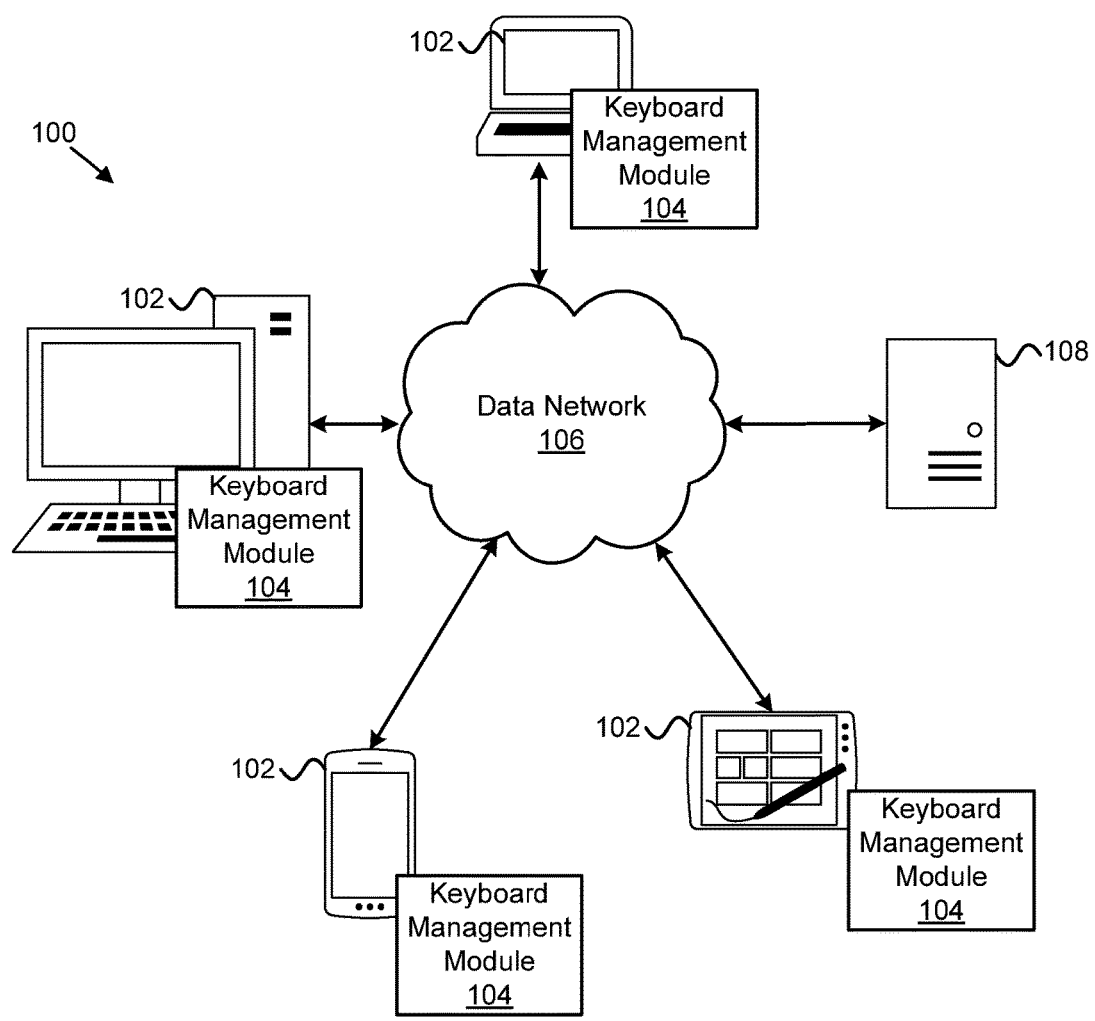
FIG. 1 is a schematic block diagram illustrating one embodiment of a system for on-screen keyboard management.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts one embodiment of a system 100 for on-screen or virtual keyboard management. In one embodiment, the system 100 includes information handling devices 102, keyboard management modules 104, data networks 106, and servers 108, which are described below in more detail. While a specific number of elements 102-108 of the system 100 are depicted in FIG. 1, any number of elements 102-108 may be included in the system 100 for on-screen keyboard management.

In one embodiment, the information handling devices 102 include electronic computing devices, such as desktop computers, laptop computers, tablet computers, smart televisions, smart phones, servers, and/or the like. The information handling devices 102, in certain embodiments, include one or more touch-enabled displays. As used herein, a touch-enabled display (otherwise known as a touchscreen) is an electronic visual display that a user can control through simple or multi-touch gestures by touching the screen with a stylus/pen and/or one or more fingers. In certain embodiments, the information handling devices 102 include virtual input interfaces that a user may interact with on the touch-enabled display, such as virtual or on-screen keyboards, menus, icons, or the like.

In one embodiment, the keyboard management module 104 is configured to determine a duration associated with a key event in response to a key press detected on an on-screen keyboard and is further configured to ignore the key press in response to determining that the duration associated with the key event satisfies a predetermined threshold. In certain embodiments, the keyboard management module 104 allows a user to rest his fingers on the touch-enabled display above the on-screen keyboard without receiving input from key presses that occur as a result of the user resting his fingers on the touch-enabled display, as described in more detail below.

The data network 106, in one embodiment, comprises a digital communication network that transmits digital communications. The data network 106 may include a wireless network, such as a wireless cellular network, a local wireless network, such as a Wi-Fi network, a Bluetooth® network, a near-field communication (NFC) network, an ad hoc network, and/or the like. The data network 106 may include a wide area network (WAN), a storage area network (SAN), a local area network (LAN), an optical fiber network, the Internet, an internet, or other digital communication network. The data network 106 may include two or more networks. The data network 106 may include one or more servers, routers, switches, and/or other networking equipment. The data network 106 may also include computer readable storage media, such as a hard disk drive, an optical drive, non-volatile memory, random access memory (RAM), or the like.

In one embodiment, the system 100 includes a server 108. The server 108 may be embodied as a desktop computer, a laptop computer, a mainframe, a cloud server, a virtual machine, or the like. In some embodiments, the information handling devices 102 are communicatively coupled to the server 108 through the data network 106. The server 108 may include data accessible by an information handling device 102 through the data network 106. The server 108, in some embodiments, may be configured as a file server, media server, email server, game server, and/or the like.

Figure 2:
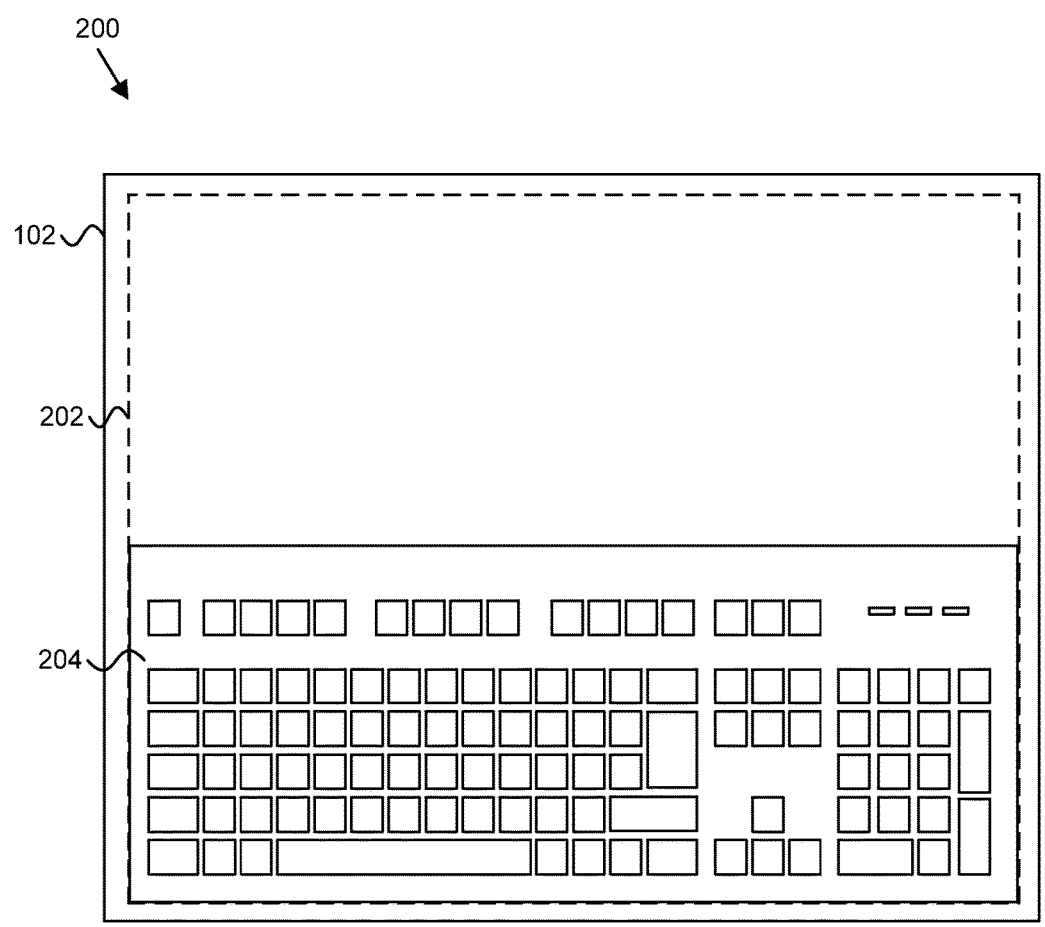
FIG. 2 illustrates one embodiment of an information handling device that includes a touch screen configured to present an on-screen keyboard.

FIG. 2 depicts one embodiment 200 of an information handling device 102 comprising a touch-enabled display 202 and an on-screen keyboard 204. In certain embodiments, the information handling device 102 may be embodied as a tablet computer comprising a touchscreen 202 and a virtual keyboard 204. The virtual keyboard 204 may receive key events in response to a user interacting with the touchscreen 202 above one or more keys of the virtual keyboard 204. The information handling device 102 may include an instance of a keyboard management module 104 that determines a duration associated with a key event in response to a key press detected by the virtual keyboard 204 and is further configured to ignore the key press in response to determining that the duration associated with the key event satisfies a predetermined threshold. In certain embodiments, the keyboard management module 104 allows a user to rest his fingers on the touch-enabled display above the on-screen keyboard without receiving input from key presses that occur as a result of the user resting his fingers on the touch-enabled display.

Unlike physical keyboards, which are designed to generate characters in response to a key down event of the key mechanism in order to preserve the intended character order and to limit perceived latency, virtual keyboards 204 generally generate characters in response to a key up event. By generating characters in response to key up events, virtual keyboards 202 may be able to avoid unintended key events caused by a single resting finger and may enable dwell functions, i.e., additional key options or features that are displayed in response to a key being selected or held down for a predetermined period of time. Thus, due to the functionality of traditional virtual keyboards 202, users may be unable to rest their fingers and/or hands on the touchscreen 202 while typing. Consequently, users may hover or float their hands above the touchscreen 202, which may cause discomfort and fatigue, especially if maintained for extended periods of time. The keyboard management module 104 may eliminate the "hover hands" effect by allowing a user to rest his hands on the touchscreen 202 above a virtual keyboard 204 without generating unintended characters.

In one embodiment, the virtual keyboard 204 may comprise a plurality of modes that each present different input characters. For example, one mode of the virtual keyboard 204 may present characters of the alphabet and another mode may present numbers and symbols. In a further embodiment, the virtual keyboard 204 may be resizeable and movable such that the virtual keyboard 204 may not always have the same size or be located at the same location. In some embodiments, the virtual keyboard 204 may be hidden or revealed in response to user input.

Figure 3:
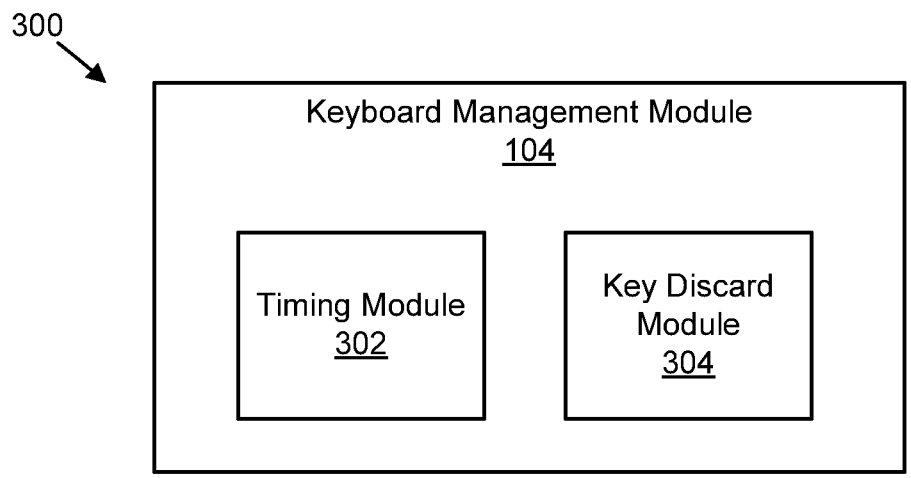
FIG. 3 is a schematic block diagram illustrating one embodiment of a keyboard management module.

FIG. 3 depicts one embodiment of a module 300 for managing an on-screen keyboard. In one embodiment, the module 300 comprises an embodiment of a keyboard management module 104. In certain embodiments, the keyboard management module 104 includes a timing module 302 and a key discard module 304, which are described in more detail below.

In one embodiment, the timing module 302 determines a duration associated with a key event in response to a key press on the on-screen keyboard. As used herein, a key event is an event triggered in response to detecting a user's interaction with a touch-enabled display on an on-screen keyboard. For example, a key down event may be triggered in response to a user "pressing" down on a displayed key of an on-screen keyboard, a key press event may be triggered while the user is "pressing" the displayed key, and a key up event may be triggered when the user lifts his finger off of the displayed key.

In one embodiment, the key discard module 304 ignores the key press in response to determining that the duration associated with the key event, as determined by the timing module 302, satisfies a predetermined threshold. The key discard module 304 ignores a key press by disregarding input associated with the pressed key. Thus, for example, if the "a" key is pressed for a duration that satisfies the predetermined threshold, the key discard module 304 ignores any input received in response to the "a" key being pressed. In certain embodiments, the value of the predetermined threshold may comprise a ceiling threshold value or a floor threshold value. In some embodiments, the predetermined threshold may be satisfied if the duration meets, exceeds, or is less than the predetermined threshold, depending on the key event associated with the duration.

In one embodiment, the key press comprises a key down event and the duration associated with the key down event comprises an amount of time that the key press is performed. In some embodiments, the timing module 302 determines the duration that the key press is performed by determining the amount of time between the key down event and a subsequent key up event for the key that is pressed. In certain embodiments, the duration is determined by the timing module 302 tracking the amount of time that a key is pressed in response to a key down event.

In some embodiments, the key discard module 304 ignores the key press in response to determining the duration associated with the key down event exceeds the predetermined threshold. For example, if the timing module 302 determines that the key press is performed for more than a predetermined threshold of 2000 milliseconds, the key discard module 304 may ignore the key press. In certain embodiments, determining that the duration exceeds the predetermined threshold indicates that the user is resting a finger on the key and is not intending to type a key.

In one embodiment, the key press comprises a key up event and the duration associated with the key up event comprises an amount of time between the key up event for the key press and a key down event for a subsequent key press. In some embodiments, the duration between the key up event and a subsequent key down event is known as the "flight time" duration. In certain embodiments, the timing module 302 determines the "flight time" duration by determining the amount of time between the key up event for the key press and a key down event for a subsequent key press.

In some embodiments, the key discard module 304 ignores the key press and/or the subsequent key press in response to the "flight time" duration being below a predetermined threshold. For example, if the timing module 302 determines that the "flight time" between the key up event for the key press and a key down event for a subsequent key press is less than a predetermined threshold of 50 milliseconds, the key discard module 304 may ignore the subsequent key press. In certain embodiments, determining that the "flight time" duration is below the predetermined threshold indicates that the user is resting a finger on a plurality of keys and is not intending to type a series of keys.

In one embodiment, the key event comprises a key down event and the duration associated with the key down event comprises an amount of time between the key down event for the key press and a key down event for a subsequent key press. In some embodiments, the duration between the key down event and a subsequent key down event is known as the "delay time" duration. In certain embodiments, the timing module 302 determines the "delay time" duration by determining the amount of time between the key down event for the key press and a key down event for a subsequent key press. In certain embodiments, the subsequent key down event overlaps with the key down event for the key press such that there is no "flight time" duration between the key presses.

In some embodiments, the key discard module 304 ignores the key press and the subsequent key press in response to the "delay time" duration being below a predetermined threshold. For example, if the timing module 302 determines that the "delay time" between the key down event for the key press and a key down event for a subsequent key press is less than a predetermined threshold of 50 milliseconds, the key discard module 304 may ignore the key press and the subsequent key press. In certain embodiments, determining that the "delay time" duration is below the predetermined threshold indicates that the user is resting a finger on a plurality of keys and is not intending to type a series of keys.

In a further embodiment, the key discard module 304 ignores the key press in response to a key up event for a subsequent key press occurring before the key up event for the key press. For example, if a user presses the "a" key and subsequently presses the "s" key, but then releases the "s" key before the "a" key is released, then the key discard module 304 may ignore the "a" key press because the key discard module 304 may determine that the user is merely resting his finger on the "a" key and is not intending to generate an "a" character.

In some embodiments, as described below with reference to the correction module 404, the arrival order of the key press and a subsequent key press is maintained based on the order of the key down events detected for the key press and the subsequent key press. Thus, in the previous example, even though the key up event for the "s" key occurred before the key up event for the "a" key, the "a" key may not be discarded by the key discard module 304 if the key down event for the "a" key occurred before the key down event for the "s" key in order to maintain the arrival order the key press and the subsequent key press.

Figure 4:
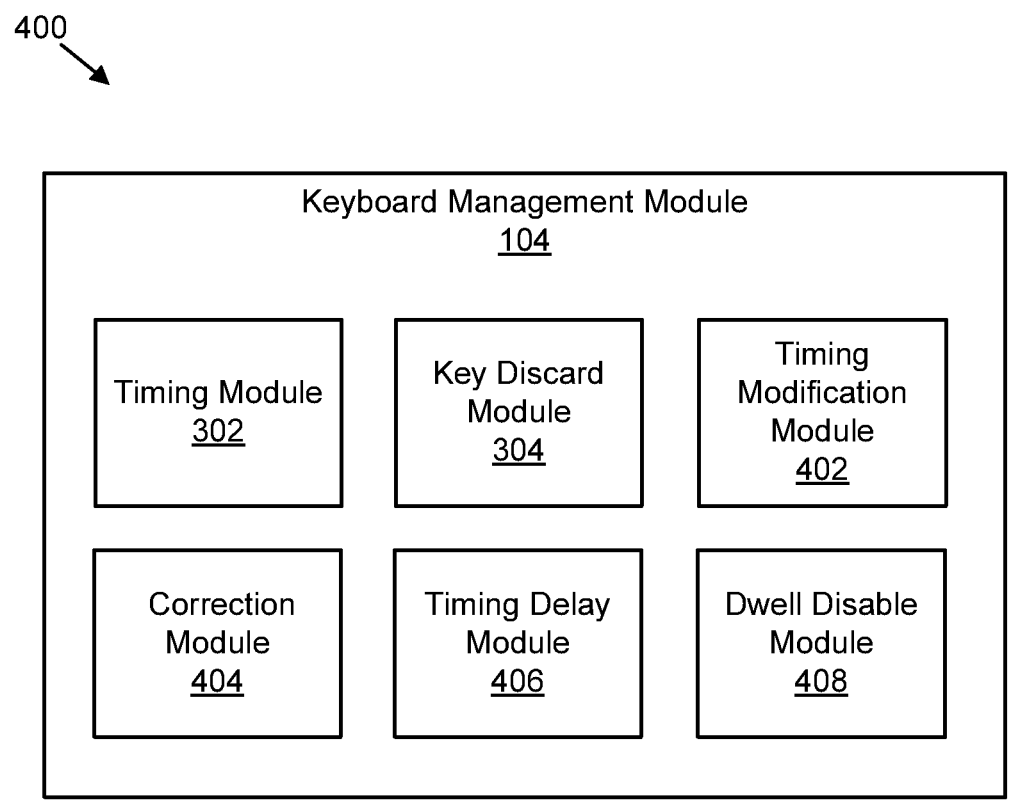
FIG. 4 is a schematic block diagram illustrating another embodiment of a keyboard management module.

FIG. 4 depicts one embodiment of a module 400 for managing an on-screen keyboard. In one embodiment, the module 400 comprises an embodiment of a keyboard management module 104. In certain embodiments, the keyboard management module 104 includes a timing module 302 and a key discard module 304, which are substantially similar to the timing module 302 and the key discard module 304 of FIG. 3. In a further embodiment, the keyboard management module 104 includes a timing modification module 402, a correction module 404, a timing delay module 406, and a dwell disable module 408, which are described in more detail below.

In one embodiment, the timing modification module 402 adjusts the predetermined threshold to correspond to a user's keystroke timing patterns. As used herein, a user's keystroke timing patterns may refer to the detailed timing information that describes when a key was pressed and when it was released as a user is typing on a keyboard. Thus, the timing modification module 402, in certain embodiments, monitors the user's typing speed, rhythm, timing of a key press and/or release, or the like, in order to determine an appropriate threshold duration used by the timing module 302. For example, the timing modification module 402 may adjust the "flight time" threshold, i.e., the amount of time between a key up event for a key press and a key down event for a subsequent key press, in response to determining that the user is a fast or slow typist.

In some embodiments, the timing modification module 402 adjusts the predetermined threshold in response to tracking the keystroke timing patterns of the user for a predetermined period of time. For example, the timing modification module 402 may adjust the predetermined threshold after monitoring the user's typing patterns for a few days, a week, a month, or the like. The timing modification module 402 may adjust the predetermined threshold according to a predefined schedule, such as every day or every week.

In certain embodiments, the timing module 302 assigns a predetermined threshold to each user associated with the information handling device 102. For example, the timing module 302 may assign a predetermined threshold to each user account associated with a tablet computer. In such an embodiment, the timing modification module 402 tracks a user's keystroke timing patterns and adjusts the predetermined threshold associated with that user, instead of adjusting a predetermined threshold assigned to all users of the device 102.

In one embodiment, the correction module 404 recommends, suggests, provides, considers, and/or promotes at least one word comprising a character associated with an ignored key press in response to a key press being ignored. In certain embodiments, the correction module 404 tracks and stores ignored key presses and determines one or more suggested words based on characters associated with the ignored key presses and any characters that have been recognized as intended character input. In a further embodiment, the correction module 404 maintains an order of character input, which may comprise intended character input and ignored character input.

For example, a user may enter an "a" character by pressing the key associated with the "a" character, an "n" character by pressing the key associated with the "n" character, and a "d" character by pressing the key associated with the "d" character. However, in a situation where the "flight time" duration between the key up event for the key press associated with the "a" character and the key down event for the key press associated with the "n" character is below the predetermined threshold, the "n" character may be ignored, even though the user intended to type the "n" character. The correction module 404, in some embodiments, in response to ignoring the "n" character, determines one or more words that a user may have intended to type, such as "and," while maintaining the order of the characters.

In one embodiment, the correction module 404 recommends one or more suggested words if the duration associated with the key event for the ignored key press is within a threshold value of the predetermined threshold. Thus, in the previous example, if the "flight time" duration between the key up event for the key press associated with the "a" character and the key down event for the key press associated with the "n" character is within 5 milliseconds of predetermined threshold (e.g., 45 milliseconds instead of the predetermined threshold of 50 milliseconds), the correction module 404 may recommend one or more suggested words using the ignored character "n."

In certain embodiments, the correction module 404 uses an autocorrect function to determine one or more recommended words. As used herein, an autocorrect function is a data validation function that may be used to correct common spelling or typing errors. In such an embodiment, the correction module 404 may send one or more recognized and ignored characters to the autocorrect function, typically in the order they were entered by a user. The correction module 404 may then receive one or more recommended words from the autocorrect function. The correction module 404 may present a list of the recommended words, which the user can interact with to select a suggested word from the list.

Figure 9:
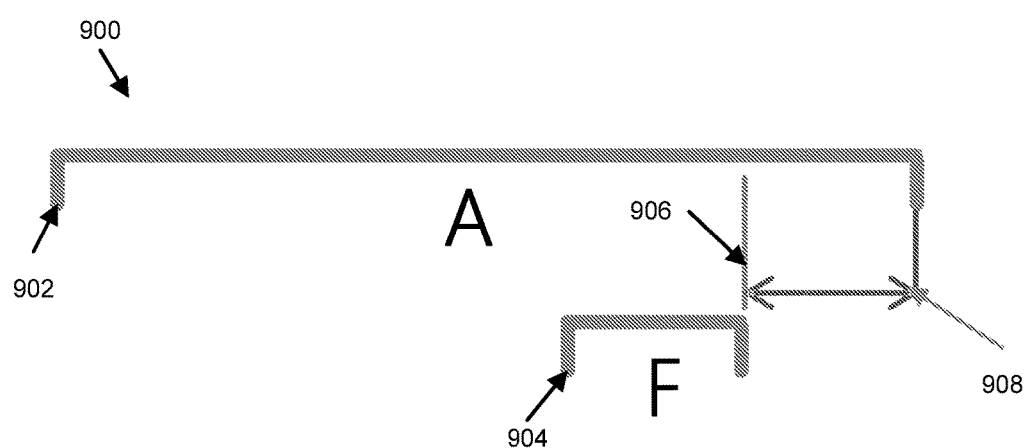
FIG. 9 illustrates another embodiment of on-screen keyboard management.

In some embodiments, the correction module 404 maintains an arrival order of a key press and a subsequent key press. As used herein, the arrival order comprises the order that key down events for a plurality of keys are detected. In such an embodiment, where key input is received in response to a key up event, the correction module 404 ensures that the arrival order is preserved such that input received from a key press is recognized before input received from a subsequent key press even though the key up event for the subsequent key press occurs before the key up event for the key press. For example, as depicted in FIG. 9 and explained in more detail below, the correction module 404 ensures that the key input for the "A" key is recognized before the key input for the "F" key, even though the key up event for the "F" key occurred before the key up event for the "A" key, because the key down event for the "A" key occurred before the key down event for the "F" key.

In one embodiment, the timing delay module 406 delays a key event as a function of the key associated with the key event being at a predefined resting location. In certain embodiments, the predefined resting location may comprise the "home row" for the keyboard. As used herein, the "home row" comprises the keys located on the keyboard where a typist typically rests his fingers. In some embodiments, the predefined resting area comprises a plurality of keys where multiple adjacent contact points occur, which is typically a "home row" of a keyboard, but could also include other resting locations, such as the keys of a ten-key pad where a user typically rests his fingers. On a standard keyboard for English speakers (e.g., a keyboard with a QWERTY keyboard layout), the "home row" comprises the keys "ASDF" for the left hand and "JKL;" for the right hand.

In some embodiments, the timing delay module 406 delays key events for the keys associated with the resting location for the on-screen keyboard such that key events are not processed, recognized, received, or the like, for a period of time. Similarly, in a further embodiment, the timing delay module 406 delays key events for keys that are adjacent to one another in the keyboard layout. In this manner, because a typist's fingers frequently touch the keys of the "home row," the timing module 302 may not begin determining a duration associated with the key event until the delay time has expired in order to determine a more accurate indication of the typist's intent regarding a key press.

In one embodiment, the dwell disable module 408 disables a dwell function associated with a key press in response to determining that the duration associated with a key event for the key press exceeds the predetermined threshold. As used herein, a dwell function presents additional options or features for a key that are displayed in response to the key being selected or held down for a predetermined period of time. For example, the dwell function for an "a" key may present other forms of the "a" character, such as different versions of the "a" character from various alphabets, in response to the user holding down the "a" key for a predetermined period of time.

The dwell disable module 408, in one embodiment, disables the dwell function of a key such that the dwell function is not activated while a user is resting his fingers on a key for a predetermined period of time. Thus, the dwell function may still be active for keys, for example, if the press duration is within a threshold range; however, if the press duration exceeds the predetermined threshold, the dwell disable module 408 may disable the dwell function for the key.

In some embodiments, the dwell disable module 408 disables the dwell function for keys located on the predefined resting location of the keyboard. Therefore, because the user consistently and frequently rests his fingers on the predefined resting location, such as the "home row" keys, the dwell disable module 408 disables the dwell function for all the keys comprising the predefined resting location.

Figure 5:
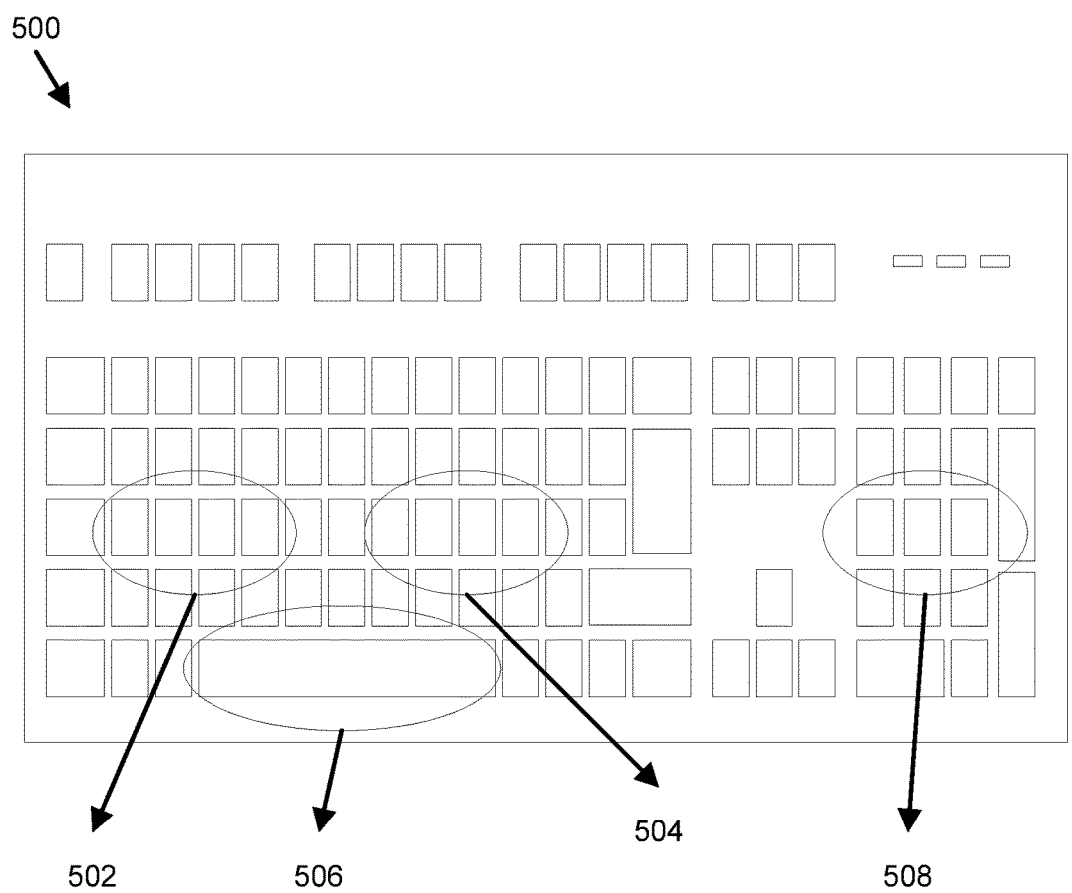
FIG. 5 illustrates one embodiment of an on-screen keyboard.

FIG. 5 depicts one embodiment of an on-screen keyboard 500. The circled portions of the keyboard 502, 504, 506 indicate predefined resting locations for a user's fingers. For example, the keys within the left-hand circle 502 may comprise the predefined resting location for the fingers of a user's left hand; the keys within the right-hand circle 504 may comprise the predefined resting location for the fingers of a user's right hand; and the key within the middle circle 506 may comprise the predefined resting location for both the thumb of the user's right hand and the thumb of the user's left hand. The keys with the circle 508 associated with the ten-key pad may comprise the predefined resting location for the ten-key pad. As described above, for a typical QWERTY keyboard, the keys within the left-hand circle 502 may comprise the "ASDF" characters, the keys within the right-hand circle 504 may comprise the "JKL;" characters, the key within the middle circle 506 may comprise the space bar. The keys within the circle 508 associated with the ten-key pad may comprise the "456" characters.

Figure 6:
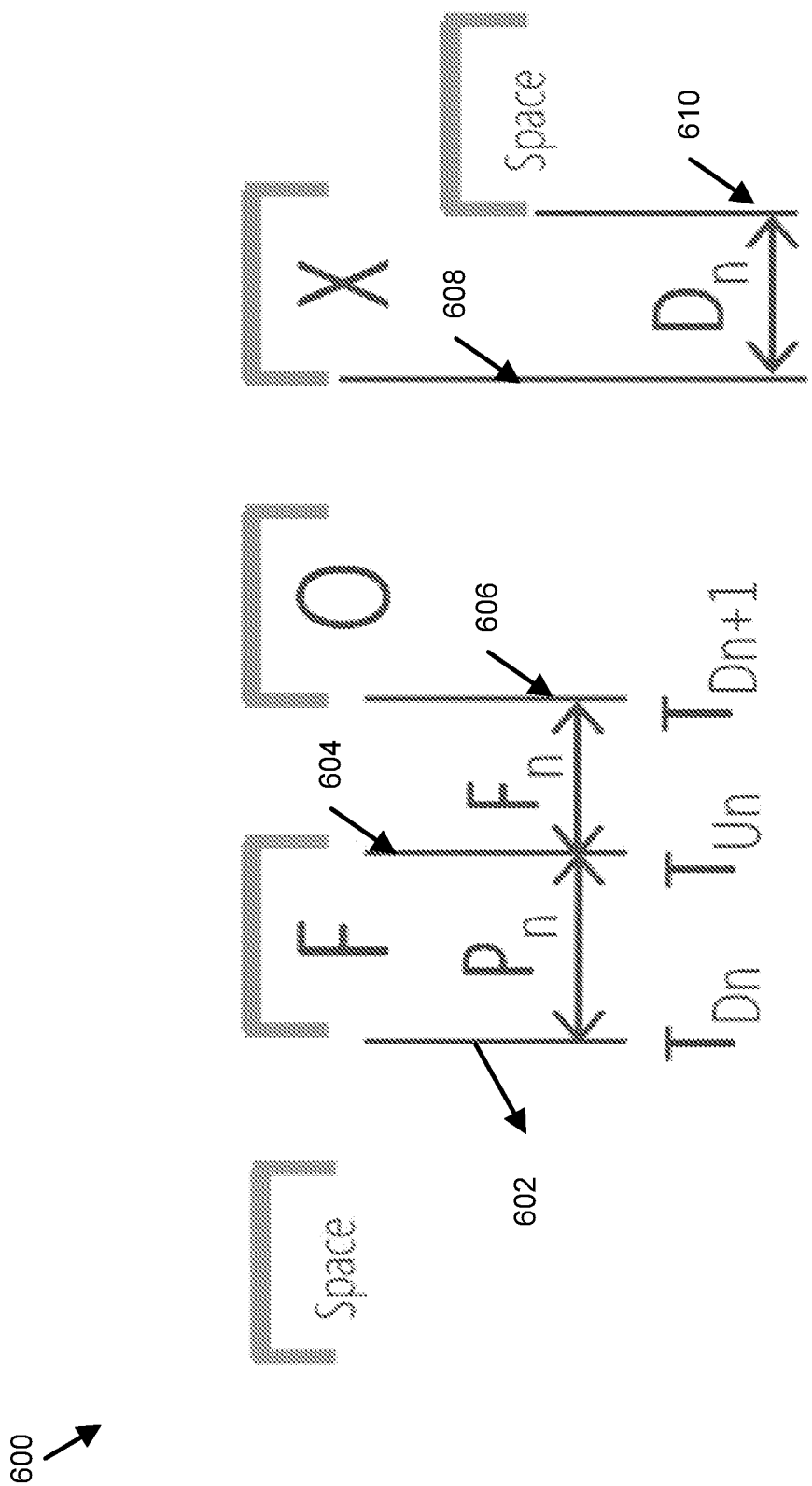
FIG. 6 illustrates one embodiment of on-screen keyboard management.

FIG. 6 depicts one embodiment 600 of managing an on-screen keyboard. In one embodiment, the on-screen keyboard detects a series of key presses by a user. In the depicted embodiment 600, the key presses comprise a "space" key, an "F," an "O," an "X," and another "space" key. In one embodiment, a key down event 602 is detected and the timing module 302 determines a duration associated with the key down event 602. In one embodiment, the duration comprises a duration that the "F" key is pressed, $P_n$, which is determined based on the amount of time between the key down event 602 and a key up event 604 for the "F" key (e.g., $P_n=T_{Un}-T_{Dn}$). If the duration, $P_n$, is above a predetermined threshold, then the key discard module 304 may ignore the "F" key, i.e., the input received from the "F" key being pressed may be ignored or discarded.

In one embodiment, the timing module 302 determines a "flight time" duration, $F_n$, based on the amount of time between the key up event 604 and a subsequent key down event 606 (e.g., $F_n=T_{Dn+1}-T_{Un}$). In such an embodiment, the key discard module 304 ignores the key press, "F," and the subsequent key press, "O," in response to the "flight time," $F_n$, being below a predetermined threshold. Similarly, if the delay time duration, $D_n$, between two overlapping down events 608, 610 is below a predetermined threshold, the key discard module 304 may ignore the key press "X," and the subsequent key press "space."

Figure 7:
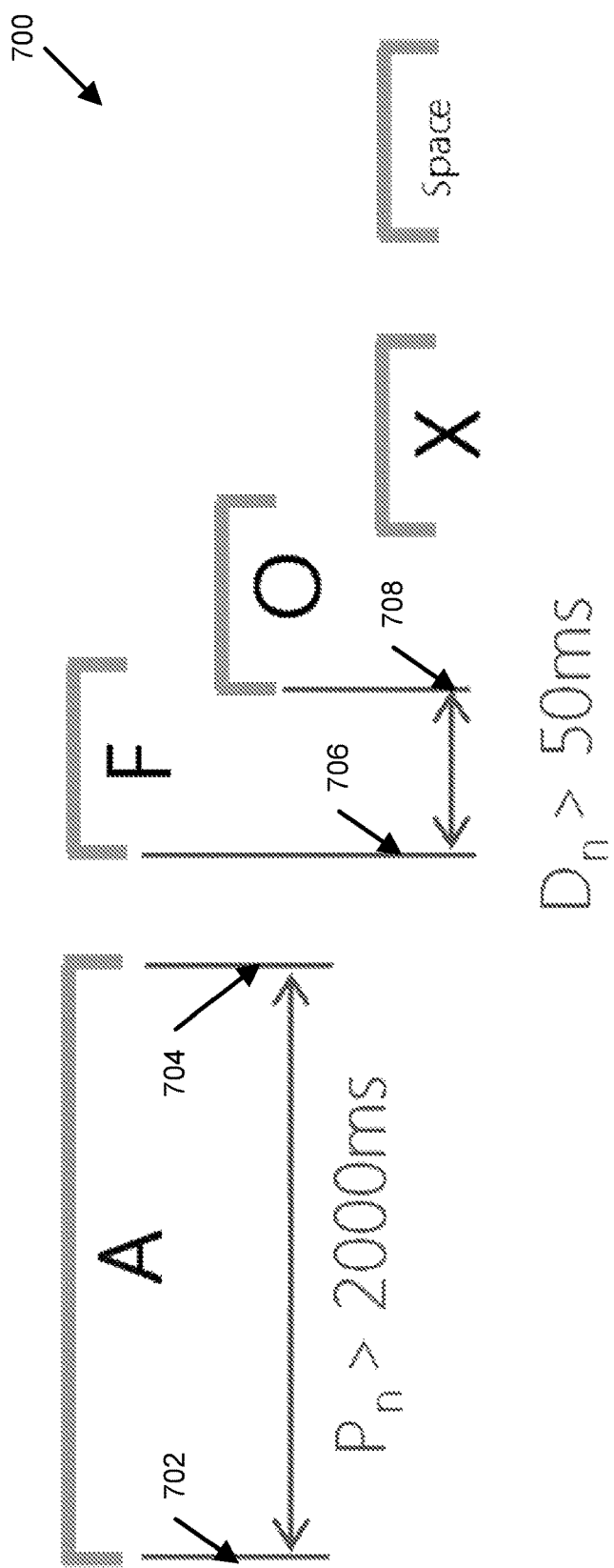
FIG. 7 illustrates another embodiment of on-screen keyboard management.

FIG. 7 depicts one embodiment 700 of managing an on-screen keyboard. In the depicted embodiment, a key down event 702 is detected in response to an "A" key being pressed on the on-screen keyboard. The timing module 302, in certain embodiments, determines a duration associated with the key down event 702. In the depicted embodiment, the duration associated with the key down event 702 for key "A" comprises a key hold duration, $P_n$, which is the amount of time between the key down event 702 and the key up event 704. In some embodiments, the key discard module 304 ignores the key "A" input in response to determining the key hold duration, $P_n$, exceeds a predetermined threshold, which, in the depicted embodiment, is 2000 milliseconds.

In one embodiment, as shown in FIG. 7, the timing module 302 determines a duration associated with a key down event 706 for a key, in this case the "F" key. The duration associated with the key down event 706 comprises a "delay time" duration, $D_n$, between the key down event 706 associated with the "F" key and a key down event 708 associated with the "O" key, which may comprise overlapping key strokes such that there is no "flight time" duration, $F_n$, between the key strokes. In certain embodiments, the key discard module 304 ignores the key press for the "F" key and the key press for the "O" key if the "delay time" is below a predetermined threshold. In the depicted embodiment, however, the "delay time" is greater than the 50 millisecond threshold value, and, therefore, input received from the "F" key and the "O" key will be recognized.

Figure 8:
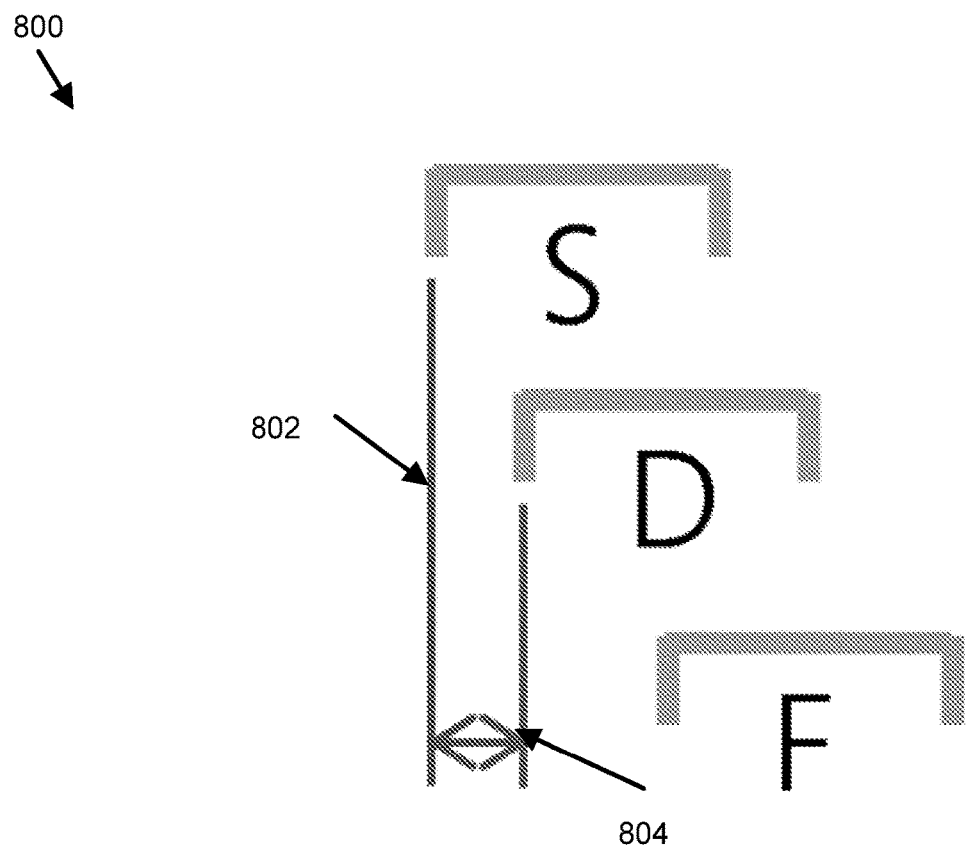
FIG. 8 illustrates one embodiment of on-screen keyboard management.

FIG. 8 depicts another embodiment 800 of managing an on-screen keyboard. As shown in FIG. 8, the timing module 302 may determine the "delay time" duration, $D_n$, between the key down event 802 for the "S" key and the key down event 804 for the "D" key and the key discard module 304 may ignore the "S" key press and the "D" key press in response to determining that the "delay time" duration is below the predetermined threshold of 40 milliseconds.

FIG. 9 depicts one embodiment 900 of managing an on-screen keyboard. In the depicted embodiment, the key up event 906 of a subsequent key press occurs before the key up event 908 of the key press. Thus, the key up event 906 for the "F" key occurs before the key up event 908 for the "A" key. In such an embodiment, the key down event 902 for the "A" key may be detected before the key down event 904 for the "F" key, but the key up event 906 for the "F" key occurs before the key up event 908 for the "A" key. In some embodiments, the key discard module 304 may ignore the key press for the "A" key.

In certain embodiments, the correction module 404 maintains an arrival order of the key press, "A," and a subsequent key press, "F." The arrival order is the order that key down events 902, 904 for the key press and the subsequent key press are detected. Input received from the key press may be recognized before input received from the subsequent key press in response to the key up event for the subsequent key press occurring before the key up event for the key press. Thus, where key input is received on key up events 906, 908, even though the key up event 906 for the "F" key occurs before the key up event 908 for the "A" key, the correction module 404 may maintain the arrival order, based on the key down events 902, 904, such that input from the "A" key is recognized before input from the "F" key without being ignored by the key discard module 404.

Figure 10:
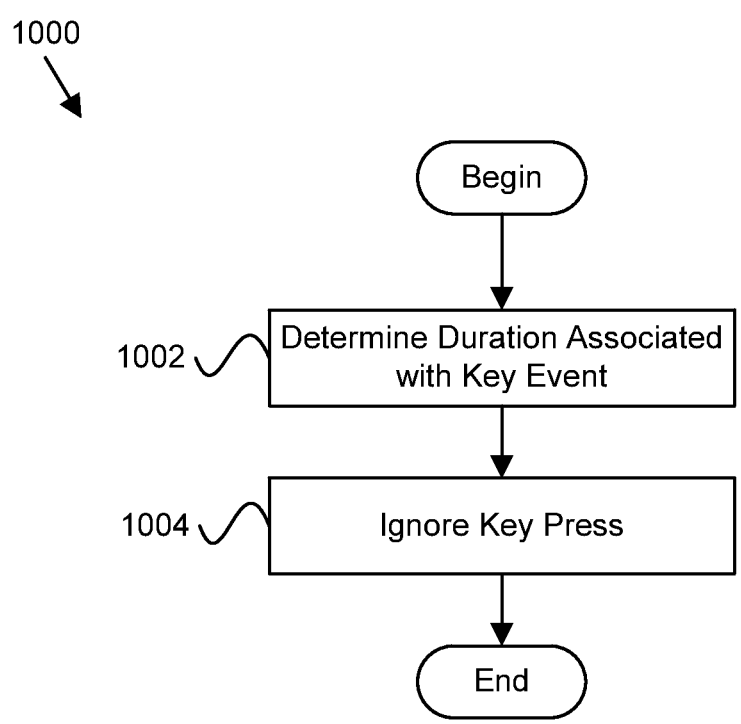
FIG. 10 is a schematic flow chart diagram illustrating one embodiment of a method for on-screen keyboard management.

FIG. 10 is a schematic flow chart diagram illustrating one embodiment of a method 1000 for on-screen keyboard management. In one embodiment, the method 1000 begins and a timing module 302 determines 1002 a duration associated with a key event in response to a key press on an on-screen keyboard. In a further embodiment, a key discard module 304 ignores 1004 the key press in response to determining that the duration associated with the key event satisfies a predetermined threshold, and the method 1000 ends.

Figure 11:
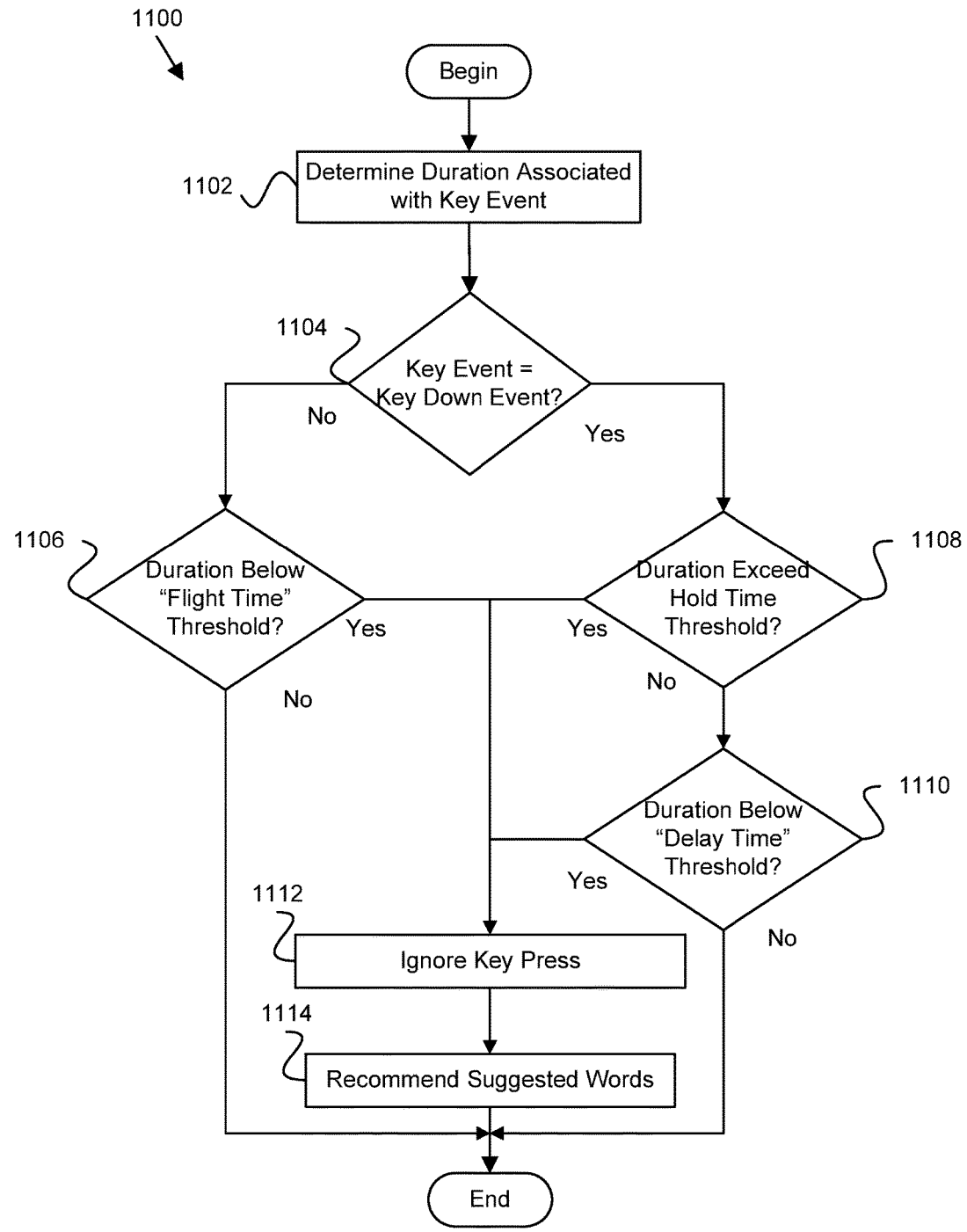
FIG. 11 is a schematic flow chart diagram illustrating another embodiment of a method for on-screen keyboard management.

FIG. 11 is a schematic flow chart diagram illustrating another embodiment of a method 1100 for on-screen keyboard management. In one embodiment, the method 1100 begins and a timing module 302 determines 1102 a duration associated with a key event for a key press. The key discard module 304 determines 1104 whether the key event comprises a key down event. If the key discard module 304 determines 1104 the key event is a key down event, then the key discard module 304 determines 1108 whether the duration associated with the key down event exceeds a predetermined hold time threshold. If the duration does exceed a predetermined hold time threshold, such as if a user is resting a finger on a key for an extended period of time, the key discard module 304 ignores 1112 the key press. Otherwise, the method 1100 ends.

If the key discard module 304 determines 1108 that the duration does not exceed a hold time threshold, the key discard module 304 may determine 1110 whether the duration is below a "delay time" threshold, i.e., the amount of time between the key down event for the key and a key down event for a subsequent key. If the key discard module 304 determines that the duration is below the "delay time" threshold, the key discard module 304 ignores the key press. Otherwise, the method 1100 ends.

In certain embodiments, if the key discard module 304 determines 1104 that the key event is not a key down event, the key discard module 304 may assume the key event is a key up event and the may determine 1106 whether the duration associated with the key up event is below a predetermined "flight time" threshold, i.e., the amount of time between a key up event for the key press and a subsequent key down event. If the key discard module 304 determines 1106 that the duration is below the predetermined "flight time" threshold, the key discard module 304 ignores 1112 the key press. Otherwise, the method 1100 ends.

In certain embodiments, where the key discard module 304 ignores 1112 the key press, the correction module 404 may recommend 1114 one or more words that include the ignored key press and one or more additional keys that have been recognized as valid key input. In this manner, the correction module 404 allows the user to select an intended word in case a key was erroneously ignored, and the method 1100 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a touch screen that displays an on-screen keyboard;
a processor operatively coupled to the touch screen;
a memory that stores code executable by the processor, the code comprising:
code that detects a key press and one or more subsequent key presses on the on-screen keyboard in response to a user resting a hand on the touch screen;
code that determines a duration associated with a key event in response to the key press on the on-screen keyboard, the key event comprising a key down event and the duration associated with the key down event comprising an amount of time between the key down event for the key press and a key down event for each of the one or more subsequent key presses, the key press and the one or more subsequent key presses maintained on the on-screen keyboard while the duration is determined; and
code that ignores the key press and the one or more subsequent key presses in response to determining that the duration between the key down event for the key press and the key down events for each of the one or more subsequent key presses while both the key press and the one or more subsequent key presses are maintained on the on-screen keyboard is less than a predetermined threshold.

2. The apparatus of claim 1, wherein the key event comprises a key down event and the duration associated with the key down event comprises an amount of time that the key press is performed, the key press being ignored in response to the duration exceeding the predetermined threshold.

3. The apparatus of claim 1, wherein the key event comprises a key up event and the duration associated with the key up event comprises an amount of time between the key up event for the key press and a key down event for a subsequent key press, the subsequent key press being ignored in response to the duration being below the predetermined threshold.

4. The apparatus of claim 1, further comprising code that maintains an arrival order of the key press and a subsequent key press, wherein input received from the key press is recognized before input received from the subsequent key press in response to a key up event for the subsequent key press occurring before a key up event for the key press.

5. The apparatus of claim 1, further comprising code that adjusts the predetermined threshold to correspond to a user's keystroke timing patterns, wherein the predetermined threshold is adjusted in response to tracking the keystroke timing patterns of the user for a predetermined period of time.

6. The apparatus of claim 1, further comprising code that suggests at least one word comprising a character associated with an ignored key press in response to the key press being ignored.

7. The apparatus of claim 1, further comprising code that delays the key event as a function of a key associated with the key event being at a predefined resting location, the key event comprising a key down event.

8. The apparatus of claim 1, further comprising code that disables a dwell function associated with the key press in response to determining that the duration associated with the key event exceeds the predetermined threshold, the key event comprising a key down event.

9. The apparatus of claim 1, further comprising code that disables a dwell function associated with the key press as a function of a key associated with the key press being at a predefined keyboard resting location.

10. A method comprising:
detecting, by use of a processor, a key press and one or more subsequent key presses on the on-screen keyboard in response to a user resting a hand on the touch screen
determining a duration associated with a key event in response to the key press on the on-screen keyboard, the key event comprising a key down event and the duration associated with the key down event comprising an amount of time between the key down event for the key press and a key down event for each of the one or more subsequent key presses, the key press and the one or more subsequent key presses maintained on the on-screen keyboard while the duration is determined; and
ignoring the key press and the one or more subsequent key presses in response to determining that the duration between the key down event for the key press and the key down events for each of the one or more subsequent key presses while both the key press and the one or more subsequent key presses are maintained on the on-screen keyboard is less than a predetermined threshold.

11. The method of claim 10, wherein the key event comprises a key down event and the duration associated with the key down event comprises an amount of time that the key press is performed, the key press being ignored in response to the duration exceeding the predetermined threshold.

12. The method of claim 10, wherein the key event comprises a key up event and the duration associated with the key press comprises an amount of time between the key up event for the key press and a key down event for a subsequent key press, the subsequent key press being ignored in response to the duration being below the predetermined threshold.

13. The method of claim 10, further comprising maintaining an arrival order of the key press and a subsequent key press, wherein input received from the key press is recognized before input received from the subsequent key press in response to a key up event for the subsequent key press occurring before a key up event for the key press.

14. The method of claim 10, further comprising adjusting the predetermined threshold to match a user's keystroke timing patterns, wherein the predetermined threshold is adjusted in response to tracking the keystroke timing patterns of the user for a predetermined period of time.

15. The method of claim 10, further comprising delaying the key event as a function of a key associated with the key event being at a predefined resting location, the key event comprising a key down event.

16. The method of claim 10, further comprising disabling a dwell function associated with the key press in response to determining that the duration associated with the key event exceeds the predetermined threshold, the key event comprising a key down event.

17. The method of claim 10, further comprising disabling a dwell function associated with the key press as a function of a key associated with the key press being at a predefined keyboard resting location.

18. A program product comprising a non-transitory computer readable storage medium that stores code executable by a processor, the executable code comprising code to perform:
- detecting a key press and one or more subsequent key presses on the on-screen keyboard in response to a user resting a hand on the touch screen;
- determining a duration associated with a key event in response to the key press on the on-screen keyboard, the key event comprising a key down event and the duration associated with the key down event comprising an amount of time between the key down event for the key press and a key down event for each of the one or more subsequent key presses, the key press and the one or more subsequent key presses maintained on the on-screen keyboard while the duration is determined; and
- ignoring the key press and the one or more subsequent key presses in response to determining that the duration between the key down event for the key press and the key down events for each of the one or more subsequent key presses while both the key press and the one or more subsequent key presses are maintained on the on-screen keyboard is less than a predetermined threshold.

\* \* \* \* \*